(12) United States Patent
Tan et al.

(10) Patent No.: US 7,900,984 B2
(45) Date of Patent: Mar. 8, 2011

(54) INTERFACE JOINT FOR MOTOR VEHICLE

(75) Inventors: Soo A. Tan, Shelby Township, MI (US); Bradley E. Bowers, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/389,451

(22) Filed: Feb. 20, 2009

(65) Prior Publication Data

US 2010/0213726 A1    Aug. 26, 2010

(51) Int. Cl.
*B62D 25/00* (2006.01)
(52) U.S. Cl. .............. 293/155; 293/132; 296/187.09; 296/29; 280/784
(58) Field of Classification Search ........... 296/187.04, 296/187.09, 29, 203.02, 204; 293/132, 133, 293/155, 154; 403/335, 217; 180/312; 280/781, 280/784
See application file for complete search history.

(56) References Cited

U.S. PATENT DOCUMENTS

| | | | |
|---|---|---|---|
| 5,324,133 A | | 6/1994 | Kreis et al. |
| 6,019,419 A | * | 2/2000 | Browne et al. ............ 296/187.1 |
| 6,237,304 B1 | * | 5/2001 | Wycech .......................... 52/847 |
| 6,523,885 B2 | * | 2/2003 | Kroning et al. .......... 296/187.03 |
| 6,820,924 B2 | * | 11/2004 | Caliskan et al. ......... 296/187.03 |
| 6,923,484 B2 | * | 8/2005 | Braun et al. ................... 293/155 |
| 7,066,509 B2 | | 6/2006 | Kollaritsch et al. |
| 7,188,877 B2 | * | 3/2007 | Gonzalez et al. ............. 293/133 |
| 7,681,700 B2 | * | 3/2010 | Ginja et al. ................... 188/377 |
| 2008/0116719 A1 | * | 5/2008 | Bae ........................... 296/187.09 |

FOREIGN PATENT DOCUMENTS

| | | |
|---|---|---|
| DE | 102005051764 A1 | 5/2007 |
| DE | 102006038674 A1 | 2/2008 |
| JP | 2001301649 A | 10/2001 |

\* cited by examiner

*Primary Examiner* — Joseph D Pape
(74) *Attorney, Agent, or Firm* — Quinn Law Group, PLLC

(57) ABSTRACT

An interface joint for a motor vehicle is provided that serves as a node to connect a longitudinal motor compartment frame rail, an energy absorbing device, referred to as a crush box, and an engine cradle. The interface joint is a unitary component having a plate portion, first and second flange portions, and an engine cradle attachment portion. The first flange portion extends longitudinally from the plate portion and is adapted for engagement with the crush box. The second flange portion extends longitudinally from the plate portion opposite the first flange portion and is adapted for engagement with the frame rail. The engine cradle attachment portion extends between the flange portions and is adapted for attachment to the engine cradle.

15 Claims, 2 Drawing Sheets

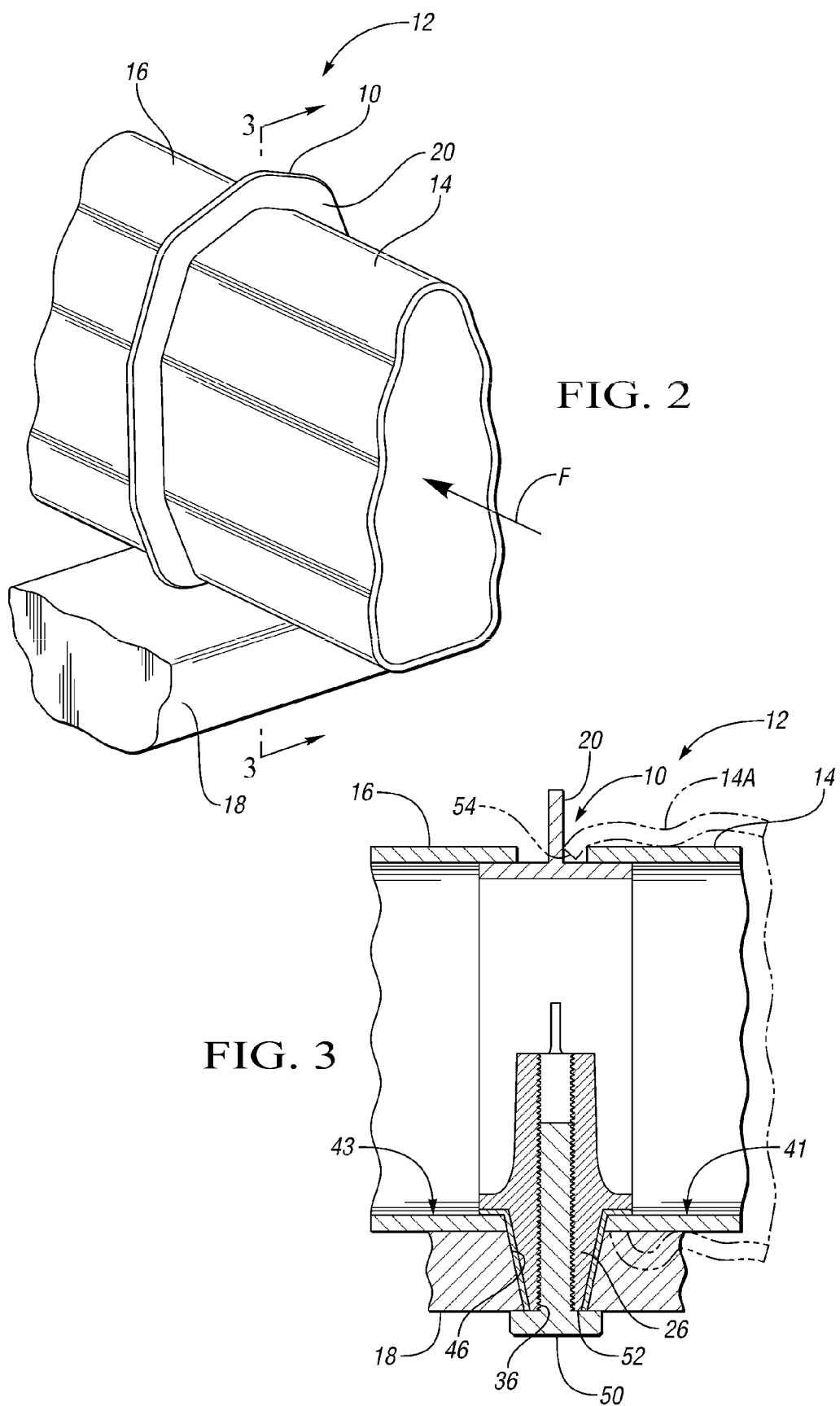

“INTERFACE JOINT FOR MOTOR VEHICLE

TECHNICAL FIELD

The invention relates to an interface joint for a motor vehicle; specifically, a joint between a crush box and a frame rail in the motor compartment.

BACKGROUND OF THE INVENTION

An energy-absorbing device, sometimes referred to as a crush box, is sometimes attached to a vehicle bumper so that in the event of a low-speed impact event, the energy-absorbing device deforms longitudinally, confining the damage to the energy-absorbing device. In some designs, the energy-absorbing device transfers the load from an impact through a plate welded onto the end of the energy-absorbing device to a plate welded onto the end of the motor compartment rail. Fasteners and/or welding are typically used to connect the energy absorbing device to the crush box and/or to the rail.

SUMMARY OF THE INVENTION

An interface joint for a motor vehicle is provided that connects a longitudinally-extending motor compartment frame rail, an energy absorbing device, referred to as a crush box, and an engine cradle. The interface joint is a unitary (i.e., a one-piece) component having a plate portion, first and second flange portions, and an engine cradle attachment portion. The first flange portion extends longitudinally from the plate portion and is adapted for engagement with the crush box. The second flange portion extends longitudinally from the plate portion opposite the first flange portion and is adapted for engagement with the frame rail. The engine cradle attachment portion extends between the flange portions and is adapted for attachment to the engine cradle. The interface joint provides a common interface to minimize discontinuities in rail structure for management of crash load and crash deformation behavior.

The first and second flange portions may have the same or different geometries, as defined by peripheral surfaces thereof, depending on the geometries of the crush box and the frame rail to which they respectively are engagable. In some embodiments, the connection to the crush box and frame rail may require no welding or additional fastener components, and thus simplifies assembly and minimizes added mass. Additionally, the joint is preferably cast of an aluminum, iron or magnesium alloy, depending on loading requirements.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic perspective partially fragmentary illustration of an assembly including the interface joint of FIG. 1 connecting a crush box, a motor compartment rail, and an engine cradle;

FIG. 3 is a schematic cross-sectional partially fragmentary illustration of the assembly of FIG. 2 taken at the lines 3-3.

DESCRIPTION OF THE PREFERRED EMBODIMENTS

Figure 1:
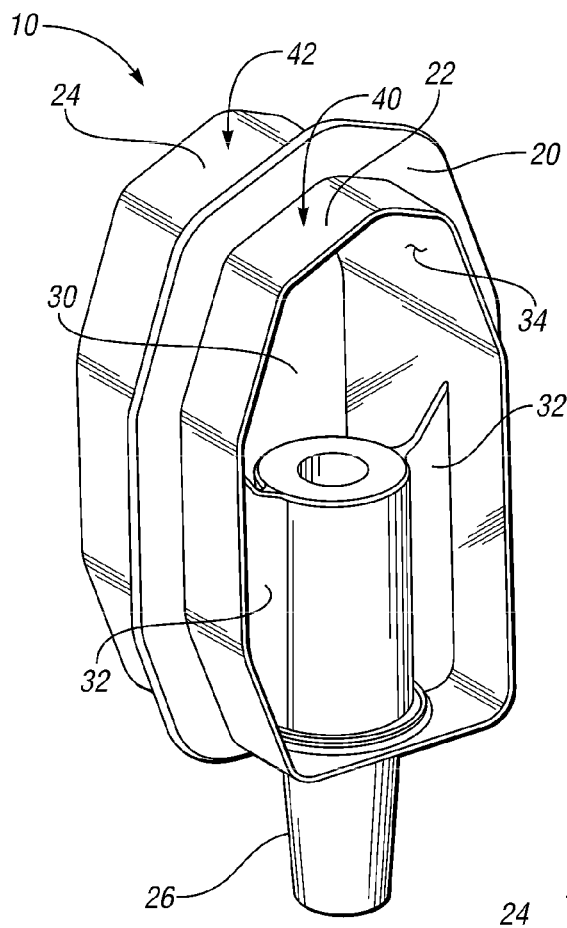
FIG. 1 is a schematic perspective illustration of a first embodiment of an interface joint for a motor vehicle.

Referring to the drawings, wherein like reference numbers refer to like components throughout the several views, FIG. 1 shows a component referred to as a unitary interface joint 10 that is configured to serve a connecting node or interface in a motor vehicle for an assembly 12 of FIG. 2 that includes a crush box 14, a longitudinal frame rail 16 and an engine cradle 18.

Referring to FIG. 1, the unitary interface joint 10 is a unitary component that is preferably cast of an aluminum, iron or magnesium alloy. The interface joint 10 has a plate portion 20 with a first endless flange portion 22 extending in a first longitudinal direction from the plate portion 20 and a second endless flange portion 24 extending in a generally opposing longitudinal direction. The flange portions 22, 24 are preferably endless, i.e., extend outward from the plate portion 20 with uninterrupted peripheral surfaces that surround a cavity 30 partially defined by the flange portions 22, 24.

The unitary interface joint 10 also includes an engine cradle attachment portion 26 extending generally perpendicularly to the flange portions 22, 24. A fastener support portion 28 is aligned with the engine cradle attachment portion 26 within a cavity 30 defined by the plate portion 20 and flange portions 22, 24. Web portions 32 connect the fastener support portion 28 within the cavity 30 to an interior surface 34 of the joint 1O. As best illustrated in FIG. 3, the engine cradle attachment portion 26 and the fastener support portion 28 have an internal opening 36 that is at least partially threaded.

Referring to FIG. 2, the unitary joint 10 secures the crush box 14 and frame rail 16 to one another and to the engine cradle 18. Impact forces represented by arrow F applied to a bumper connected with a forward most end of the crush box (not shown) are transferred to the joint 10. As illustrated in FIG. 3, the crush box 14 and frame rail 16 are secured to the interface joint 10. The connection may be by a slip or press fit as shown, without the use of fasteners, welding or adhesives. In other embodiments, welding, adhesion bonding or mechanical fasteners may be used. Specifically, a peripheral geometric surface 40 (see FIG. 1) of the first flange portion 22 is configured to mate with an internal surface 41 (see FIG. 3) of the crush box 14 to press fit the crush box 14 to the joint 10. Similarly, a peripheral geometric surface 42 (see FIG. 1) of the second flange portion 24 is configured to mate with an internal surface 43 of the frame rail 16 to press fit the frame rail 16 to the joint 10 without the use of fasteners, welding or adhesives. The geometric surfaces 40, 42 are irregularly shaped to substantially conform to the shapes of the crush box 14 and the frame rail 16. Alternatively, the shapes of the flange portions 22, 24 and the surfaces 40, 42 need not identically conform to or track the shapes of the crush box 14 and frame rail 16, but at least some portions of the surfaces 22, 24 must abut the inner surfaces 41, 43, external surfaces, or external surface of one and internal surface of the other, of the crush box 14 and frame rail 16, respectively.

Referring to FIG. 3, the cradle attachment portion 26 extends through an aperture 46 in the engine cradle 18. The opening 36 is at least partially threaded to receive a threaded fastener 50 at a distal end 52 of the cradle attachment portion 26 to secure the joint 10 to the engine cradle 18.

Impact forces F on the crush box 14 are absorbed by deformation of the crush box 14, as is known, and/or some portion of the impact energy may be transferred to the joint 10 and to the cradle 18 and frame rail 16 attached thereto. Deformation of the crush box 14 toward the joint 10 may cause the distal end 54 of the crush box 14 to impact the plate portion 20 for energy dissipation via the joint 10. The deformed crush box is illustrated in phantom as 14A in FIG. 3.

Figure 4:
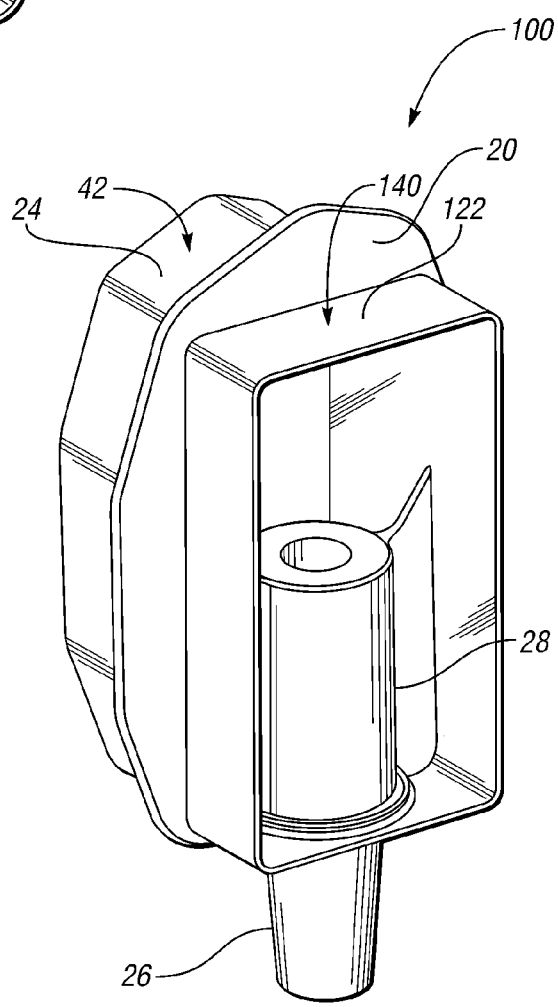
FIG. 4 is a schematic perspective illustration of a second embodiment of an interface joint.

The joint 10 is designed with flange portions 22, 24 that have peripheral surfaces 40, 42 with substantially identical shapes in order to receive the substantially identically shaped end portions of the crush box 14 and frame rail 16. FIG. 4 illustrates an alternative joint 100 alike in all aspects to the joint 10 of FIGS. 1 and 2, except that the first flange portion 122 is of a different shape than the first flange portion 22 and than the second flange portion 24 and provides a differently-shaped geometric surface 140 in order to receive and support a differently shaped crush box (not shown, but having a substantially rectangular shape).

By integrating the connecting functions for the crush box 14, the frame rail 16 and the engine cradle 26 into a single, unitary joint, tolerance stack ups encountered with assembling multi-component assemblies are avoided.

While the best modes for carrying out the invention have been described in detail, those familiar with the art to which this invention relates will recognize various alternative designs and embodiments for practicing the invention within the scope of the appended claims.

The invention claimed is:

1. An interface joint for a motor vehicle having a longitudinal rail, a crush box and an engine cradle, comprising:
    a unitary component having
    a plate portion;
    a first flange portion extending from the plate portion and adapted for engagement with the crush box;
    a second flange portion extending from the plate portion opposite the first flange and adapted for engagement with the frame rail; and
    an engine cradle attachment portion extending between the flange portions and adapted for attachment to the engine cradle.

2. The interface joint of claim 1, wherein the plate portion and the first and second flange portions define a cavity, and further comprising:
    a fastener support portion within the cavity aligned with the engine cradle attachment portion.

3. The interface joint of claim 2, wherein the engine cradle attachment portion and the fastener support portion have an internal opening extending from a distal end of the engine cradle attachment portion.

4. The interface joint of claim 3, further comprising:
    web portions connecting the fastener support portion to an interior surface of the joint at the cavity.

5. The interface joint of claim 3, wherein the internal opening is threaded.

6. The interface joint of claim 1, wherein the first flange portion has a first geometry and the second flange portion has a second geometry.

7. The interface joint of claim 1, wherein the first and second flange portions are configured to be received within the crush box and the rail, respectively, with the plate portion extending between the crush box and rail.

8. The interface joint of claim 1, wherein the interface joint is one of cast aluminum, cast iron, and cast magnesium.

9. The interface joint of claim 1, wherein each of the first and second flange portions has an endless peripheral surface.

10. An assembly for a motor vehicle, comprising:
    a longitudinally-running frame rail;
    a crush box;
    an engine cradle;
    a unitary interface joint configured for connection to the frame rail, the crush box and the engine cradle and configured for bearing impact loads applied to the crush box;
    wherein the interface joint has a plate portion with first and second flange portions extending generally perpendicular therefrom in opposing longitudinal directions; and
    wherein the first flange portion is configured to be received within the crush box, and the second flange portion is configured to be received within the frame rail.

11. The assembly of claim 10, wherein the first flange portion has a first peripheral surface substantially following an inner surface of the crush box for slip fit therein; and wherein the second flange portion has a second peripheral surface substantially following an inner surface of the frame rail for slip fit therein.

12. The assembly of claim 10, wherein the plate portion extends between terminal ends of the frame rail and the crush box for receiving impact loads.

13. The assembly of claim 10, wherein the interface joint has an engine cradle attachment portion extending between the first and second flange portions; and
    wherein the engine cradle has an aperture sized to receive the engine cradle attachment portion.

14. The assembly of claim 13, wherein the engine cradle attachment portion has a threaded opening extending parallel with the aperture for receiving a fastener to secure the joint to the engine cradle.

15. An interface joint for a motor vehicle having a longitudinal rail, a crush box and an engine cradle, comprising:
    a unitary component having
    a plate portion;
    a first endless flange portion extending longitudinally from the plate portion and adapted for supporting the crush box about a peripheral surface of the first endless flange portion;
    a second endless flange portion extending longitudinally from the plate portion opposite the first endless flange and adapted for supporting the front rail about a peripheral surface of the second endless flange portion; and
    an engine cradle attachment portion extending generally perpendicular to the flange portions and adapted for attachment to the engine cradle, the crush box and longitudinal rail thus being supported via the unitary component on the engine cradle.

\* \* \* \* \*